United States Patent
Matsuda et al.

(10) Patent No.: US 7,969,504 B2
(45) Date of Patent: Jun. 28, 2011

(54) CAMERA SYSTEM AND CAMERA

(75) Inventors: Toshiharu Matsuda, Souka (JP); Kazunari Orii, Yokohama (JP)

(73) Assignee: Nikon Corporation, Tokyo (JP)

( * ) Notice: Subject to any disclaimer, the term of this patent is extended or adjusted under 35 U.S.C. 154(b) by 634 days.

(21) Appl. No.: 11/979,203

(22) Filed: Oct. 31, 2007

(65) Prior Publication Data

US 2008/0106630 A1  May 8, 2008

(30) Foreign Application Priority Data

Nov. 6, 2006  (JP) .................................. 2006-300608

(51) Int. Cl.
*H04N 5/222* (2006.01)

(52) U.S. Cl. .................... 348/371; 348/370; 348/333.02; 396/164

(58) Field of Classification Search ......................... None
See application file for complete search history.

(56) References Cited

U.S. PATENT DOCUMENTS

| 4,724,453 | A | * | 2/1988 | Hamano | 396/297 |
| 6,661,460 | B1 | | 12/2003 | Higuchi | |
| 2003/0026606 | A1 | * | 2/2003 | Ume | 396/164 |
| 2004/0174454 | A1 | | 9/2004 | Okamura | |
| 2005/0157208 | A1 | | 7/2005 | Park et al. | |
| 2005/0219405 | A1 | * | 10/2005 | Ichihara | 348/370 |

FOREIGN PATENT DOCUMENTS

| JP | A 06-332046 | 12/1994 |
| JP | A 2006-064763 | 3/2006 |

OTHER PUBLICATIONS

Extended Search Report issued in European Patent Application No. 07120024.0; mailed Sep. 15, 2010.

* cited by examiner

*Primary Examiner* — Jason Chan
*Assistant Examiner* — Yih-Sien Kao
(74) *Attorney, Agent, or Firm* — Oliff & Berridge, PLC

(57) ABSTRACT

A camera system including a camera having an image displaying unit that displays various images and an external flash device that is connected to the camera when in use. To the camera is connectable either a first external flash device whose light emission amount is settable according to an operation input to the first external flash device by a user or a second external flash device whose light emission amount is settable based on information on a light emission amount transmitted from the camera as the external flash device. The camera displays an image having a different content on the image display unit between when the first external flash device is connected thereto and when the second external flash device is connected thereto.

5 Claims, 10 Drawing Sheets

SETTING MENU SCREEN FOR INTERNAL FLASH

LIGHT EMISSION AMOUNT SETTING SCREEN

SETTING MENU SCREEN FOR CAMERA-SET TYPE FLASH

LIGHT EMISSION AMOUNT SETTING SCREEN

SETTING MENU SCREEN FOR SELF-SET TYPE FLASH

CAMERA SYSTEM AND CAMERA

INCORPORATION BY REFERENCE

The disclosure of the following priority application is herein incorporated by reference:

Japanese Patent Application No. 2006-300608 (filed Nov. 6, 2006).

BACKGROUND OF THE INVENTION

1. Field of the Invention

The present intention relates to a camera system including a camera and a flash device externally connected to the camera.

2. Description of Related Art

Heretofore, a camera that disables a flash mechanism incorporated in the camera when a flash device is externally attached and enables the external flash device has been widely known (see Japanese Laid-open Patent Application No. 6-332046).

In recent years, there has been widely used an external flash device capable of switching between an automatic light emission mode in which the light emission amount of the external flash device is automatically adjusted depending on photographing conditions in response to an instruction from the camera and a manual light emission mode in which light emission occurs in a predetermined light emission amount. The external flash device of the above-mentioned type usually includes an operation member and a display panel for use in setting light emission conditions, such as a light emission mode and a light emission amount. With an external flash device without operation members and display panels for use in setting light emission conditions, it is necessary to set the light emission amount through the camera. The conventional camera as disclosed in Japanese Laid-open Patent Application No. 6-332046 can not appropriately operate when the external flash device is set for light emission conditions by a different method as mentioned above.

SUMMARY OF THE INVENTION

The camera system according to a first aspect of the present invention includes a camera having an image displaying unit that displays various images and an external flash device that is connected to the camera when in use. Either one of a first external flash device whose light emission amount is settable according to an operation input to the first external flash device by a user or a second external flash device whose light emission amount is settable based on information on a light emission amount transmitted from the camera is connectable to the camera as the external flash device. The camera displays an image having a different content on the image display unit between when the first external flash device is connected thereto and when the second external flash device is connected thereto.

According to a second aspect of the present invention, the camera in the camera system according to the first aspect, displays a setting menu screen including various setting menu items for performing various types of setting on the image display unit. On this occasion, it is preferred that the camera causes a setting menu item included in the setting menu screen displayed on the image display unit when the first external flash device is connected to the camera and a setting menu item included in the setting menu screen displayed on the image display unit when the second external flash device is connected to the camera to vary one from another to thereby cause the content of the image displayed on the image display unit to differ.

According to a third aspect of the present invention, it is more preferred that the camera in the camera system according to the second aspect is such that when the external flash device is not connected to the camera, the camera displays on the image display unit a setting menu screen including an internal flash setting menu which is a setting menu item for performing setting of a light emission amount of the internal flash device incorporated in the camera; when the first external flash device is connected to the camera, the camera displays on the image display unit a setting menu screen with a varied display form of the internal flash setting menu; or when the second external flash device is connected to the camera, the camera displays on the image display device a setting menu screen including an external flash setting menu which is a setting menu item for performing setting of a light emission amount of the external flash device instead of the internal flash setting menu.

According to a fourth aspect of the present invention, the camera in the camera system according to the first aspect may be such that when the second external flash device is connected to the camera and if a direction of the second external flash device is not a predetermined direction, the camera displays on the image display device a warning screen for informing a user to this effect; or when the first external flash device is connected to the camera, the camera does not display the warning screen on the image display unit.

The camera according to a fifth aspect of the present invention is one used in the camera system according to the first through fourth aspects.

The camera according to a sixth aspect of the present invention includes an image display unit that displays various images; and a connection unit that connects with either one of a first external flash device whose light emission amount is settable according to an operation input to the first external flash device by a user or a second external flash device whose light emission amount is settable based on information on a light emission amount transmitted from the camera. The camera displays an image having a different content on the image display unit between when the first external flash device is connected thereto and when the second external flash device is connected thereto.

The camera according to a seventh aspect of the present invention is a camera adapted to be connected with an external flash device and includes an operation member that sets a light emission amount of the external flash device when the external flash device is connected to the camera; and a light emission amount setting unit that transmits information on the light emission amount set by the operation member to the external flash device.

According to an eighth aspect of the present invention, the camera according to the seventh aspect preferably includes a determination unit that determines whether or not the external flash device connected to the camera is a self-set type external flash device whose light emission amount is settable in response to an operation input by a user into the external flash device; and a controlling unit that prohibits setting of the light emission amount through the operation member when it is determined by the determination unit that the external flash device is the self-set type external flash device.

DESCRIPTION OF THE PREFERRED EMBODIMENTS

Figure 1:
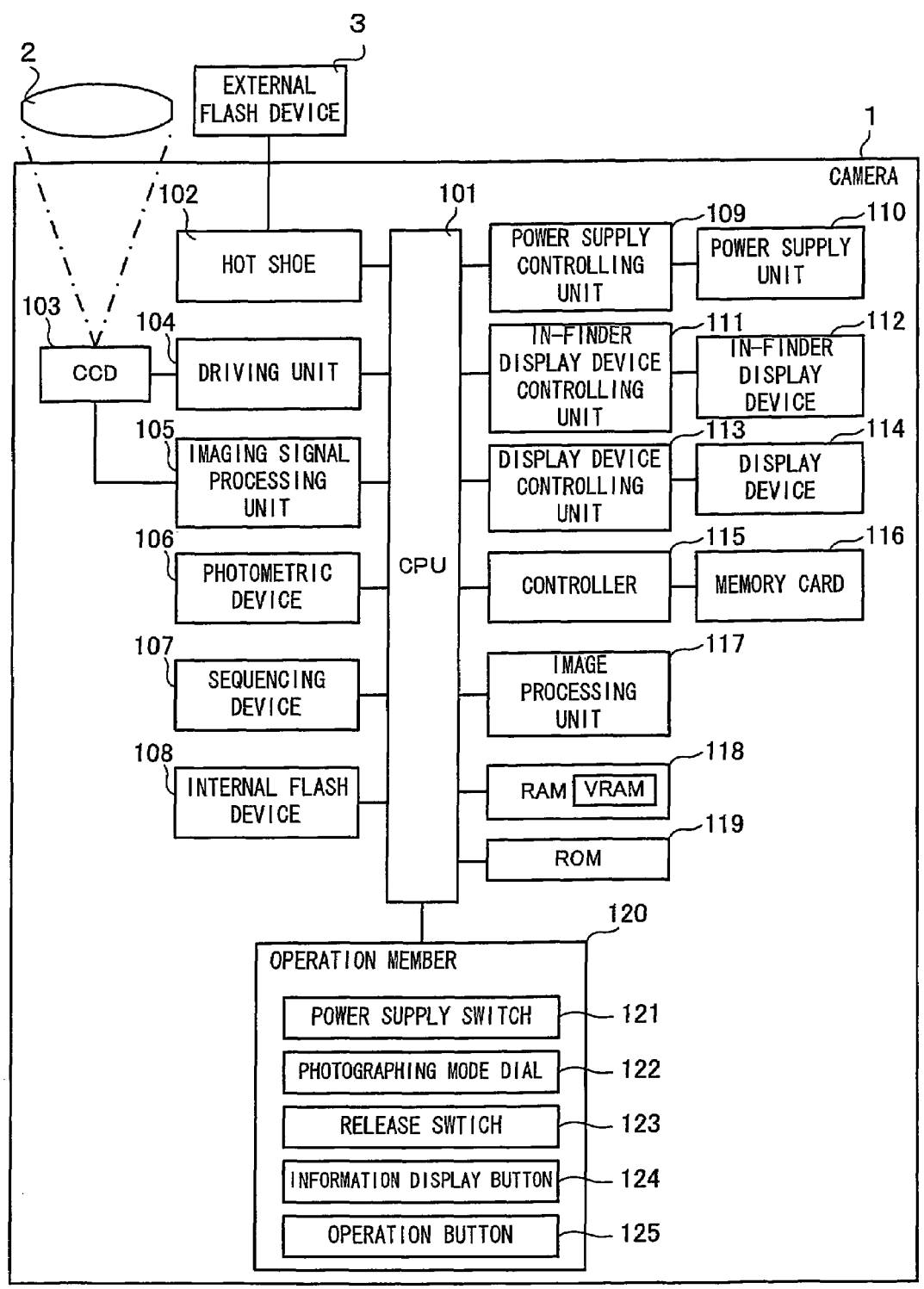
FIG. 1 is a block diagram presenting a configuration of a camera system according to an embodiment of the present invention.

FIG. 1 is a block diagram illustrating the configuration of the digital camera system according to an embodiment of the present invention. The camera system includes a camera 1, a photographic lens 2 and an external flash device 3. The photographic lens 2 and the external flash device 3 are attached to the camera 1. The camera 1 includes a CPU 101, a hot shoe 102, a CCD 103, a driving unit 104, an imaging signal processing unit 105, a photometric device 106, a sequencing device 107, an internal flash device 108, a power supply controlling unit 109, a power supply unit 110, an in-finder display device controlling unit 111, an in-finder display device 112, a display device controlling unit 113, a display device 114, a controller 115, a memory card 116, an image processing unit 117, a RAN 118, a ROM 119, and an operation member 120.

The CPU 101 performs various processing and controls in cooperation with other components. The CPU 101 performs appropriate processing and controls according to the operation state of the camera 1 to realize various functions and operations in the camera 1.

The hot shoe 102 is a part of the camera 1 for attaching thereto an external device used when the external flash device 3 is attached and connected to the camera 1. When the camera 1 and the external flash device 3 are connected to each other through the hot shoe 102, the CPU 101 and the external flash device 3 are electrically connected via contacts provided in the both. With this configuration, the light emission of the external flash device 3 can be controlled from the camera 1. Also, communication of information on setting of light emission amount of the external flash device 3 is performed between the CPU 101 and the external flash device 3. The content of the information varies depending on the type of the external flash device 3 as will be detailed hereinbelow.

The CCD 103 converts a subject image formed by a light flux that enters therein from the photographic lens 2 into imaging signals and outputs the imaging signals to the imaging signal processing unit 105. On this occasion, the operation of the CCD 103 is controlled by the driving unit 104. The imaging signal processing unit 105 performs predetermined signal processing on the imaging signals output from the CCD 103 to convert the imaging signals into image data. The image data are output to the image processing unit 117 through the CPU 101.

The photometric device 106 measures the amount of incident light from the photographic lens 2 and acquires appropriate exposure upon photographing based on the results of measurement. The appropriate exposure acquired by the photometric device 106 is output to the CPU 101 and is used for controlling the driving unit 104 and the sequencing device 107 by the CPU 101. The sequencing device 107 controls a series of operations of the mechanism of photographing, such as the operation of a quick return mirror and the operation of a shutter in response to an instruction from the CPU 101.

The internal flash device 108 is a flash device that is incorporated in the camera from the beginning separately from the external flash device 3 and its operation is controlled by the CPU 101. Note that when the external flash device 3 is attached to the camera 1, there is no need to use the internal flash device 108, so that the operation of the internal flash device 108 is prohibited or the internal flash device 108 is disabled by the CPU 101.

The power supply controlling unit 109 controls the power supply unit 110 depending on the operation state of the camera 1. This allows power necessary for each part of the camera 1 to be supplied as appropriate from the power supply unit 1. The in-finder display device controlling unit 111 displays various pieces of information on the in-finder display device 112 provided in the finder of the camera 1 according to the operation state of the camera 1. For example, information such as shutter speed, aperture value, and autofocusing area is displayed on the in-finder display device 112. This makes it possible to let the user know of information required upon photographing.

The display device controlling unit 113 controls the image content displayed by the display device 114 in response to an instruction from the CPU 101. As a result, various types of images are displayed on the display device 114. For example, an image taken by the camera 1 and a setting menu screen including various setting menu items are displayed on the display device 114. The display device 114 includes, for example, a liquid crystal display and is arranged in a position of the camera 1 which the user can easily look at.

The controller 115 executes write-in processing when recording photographed image data in the memory card 116 and read-out processing when reading out the recorded photographed image data from the memory card 116. The memory card 116 is a general-purpose external recording medium capable of being detachably attached to the camera 1, and the photographed image data taken by the camera 1 is recorded by the write-in processing by the controller 115.

The image processing unit 117 performs predetermined processing on the image data output from the imaging signal processing unit 105 through the CPU 101. For example, processing for adjusting the appearance of the photographed image and processing for converting the format of image data are performed in the image processing unit 117. The image data subjected to the image processing by the image processing unit 1117 are recorded in the memory card 106 by the controller 115.

The RAM 118 is used as a working area when the CPU 101 executes various processing and controls. The RAM 118 includes a VRAM which is used for displaying the image on the display device 114. The ROM 119 records programs and data used when the CPU 101 executes various processing and controls.

The operation member 120 includes a power supply switch 121, a photographing mode dial 122, a release switch 123, an information display button 124, and an operation button 125. The power supply switch 121 is a switch to switch between ON and OFF of the power supply of the camera 1. The photographing mode dial 122 is a dial for instructing the camera 1 to switch between photographing modes. The release switch 123 is a switch for causing the camera 1 to perform photographing. The information display button 124 is a button for causing the display device 114 to display various pieces of information on the operation state and setting state of the camera 1. The operation button 125 is a button for performing various operations other than those described above and includes, for example, a plurality of types of buttons and cross-shape keys. The operation content input by the user of the camera 1 using these is output from the operation member 120 to the CPU 101 and the processing and controls depending on the operation content are executed in the CPU 101.

Figure 2:
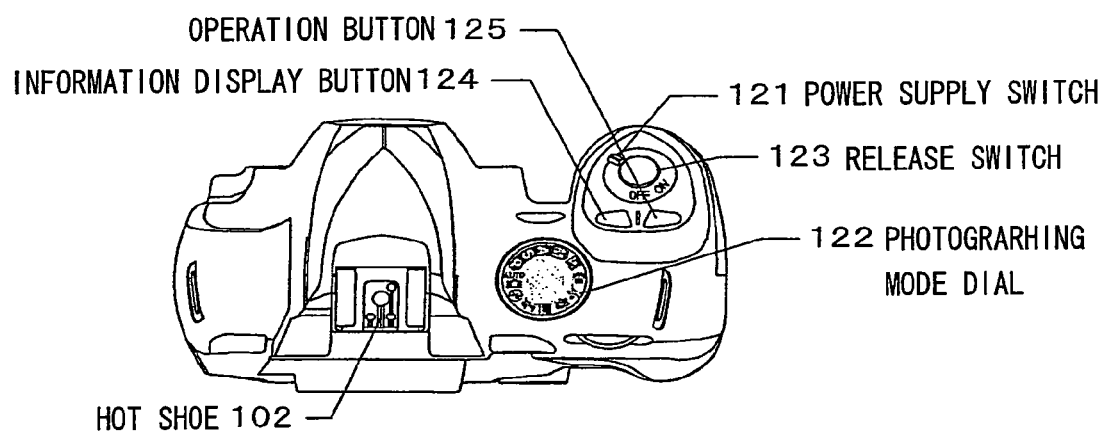
FIG. 2 shows an external view of a camera seen from above.
Figure 3:
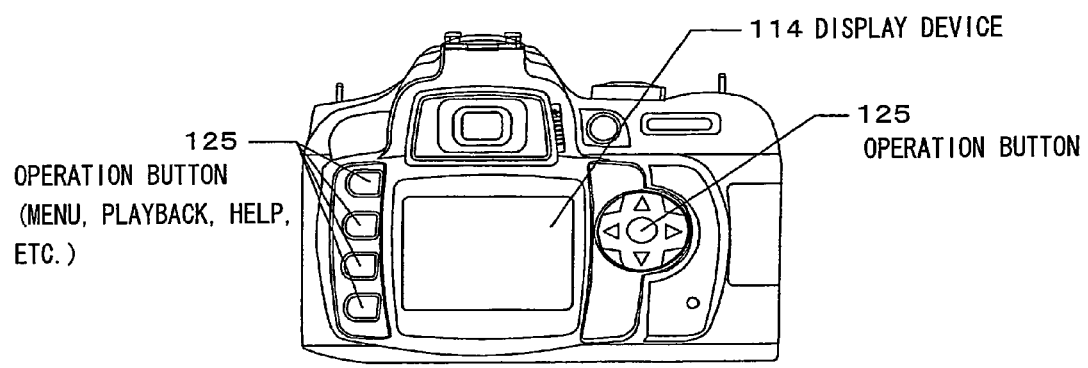
FIG. 3 shows an external view of the camera seen toward the rear surface thereof.

An example of the appearance of the camera 1 in the camera system detailed above is shown in FIG. 2 and FIG. 3. FIG. 2 shows an appearance of the camera 1 seen from above and FIG. 3 shows an appearance of the camera 1 seen from the rear side. In the camera 1, the power supply switch 121, the photographing mode dial 122, the release switch 123, and the information display button 124 are each arranged as shown in FIG. 2 and FIG. 3. The hot shoe 102 is arranged on the top of the camera 1 so as to facilitate attachment of the external flash device 3 to the hot shoe 102. The display device 114 is arranged near the center of the rear surface of the camera 1. One of the operation buttons 125 is arranged next to the information display button 124 as shown in FIG. 2. As shown in FIG. 3, four buttons and one cross-shape key as the operation buttons 125 are arranged on each side of the display device 114, respectively. The operation buttons 125 are assigned different operation contents, respectively.

Figure 4:
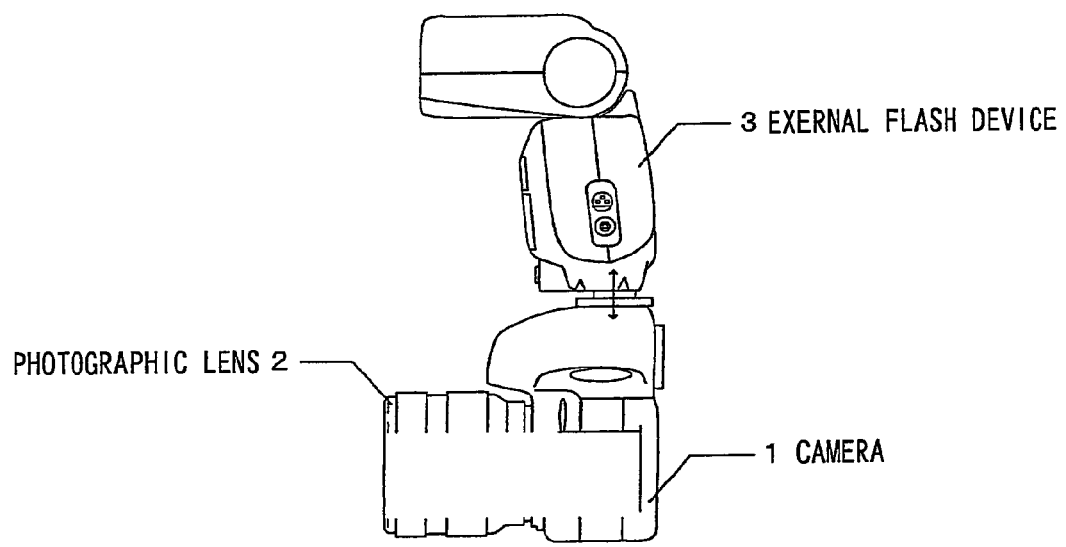
FIG. 4 shows a side view of the camera when the camera is provided with a photographic lens and an external flash device.

FIG. 4 shows a side view of the camera 1 to which the photographic lens 2 and the external flash device 3 are attached. In this attached state, communication of necessary information is performed between the camera 1 and the external flash device 3. This enables one to control the light emission timing and light emission amount of the external flash device 3 when photographing is performed by the camera 1 according to a predetermined light emission mode and in a light emission amount depending on the photographing state then.

The user can set the light emission mode and the light emission amount in advance by performing setting of light emission conditions to the external flash device 3. The light emission mode may be set by selecting either one of automatic light emission mode in which the light emission amount is automatically adjusted depending on the photographing state according to the instruction from the camera 1 or a manual light emission mode in which light emission occurs in a predetermined light emission amount. On the other hand, the light emission amount can be set freely to any desired light emission amount within the range up to a maximal light emission amount that the external flash device 3 can emit, only when the manual light emission mode is selected. Note that when the automatic light emission mode is selected, the light emission amount is automatically adjusted by the instruction from the camera 1, so that there is no need to set the light emission amount in advance.

Note that there are two types of the external flash device 3. One is provided with an operation member for setting light emission conditions and the other is provided with no operation member. Due to this difference in type, setting of light emission conditions can be performed in two manners. In one manner, the user operates the external flash device 3 directly and in another manner the user operates the camera 1 to which the external flash device 3 is connected, thus operating the external flash device 3 indirectly.

That is, when the external flash device 3 is provided with the operation member for setting light emission conditions, the user can operate the operation member to set the light emission mode and light emission amount. On the other hand, when the external flash device 3 is provided with no operation member for setting light emission conditions, the user can operate the operation member 120 of the camera 1 to set the light emission mode and light emission amount, resulting in transmission of information on the light emission mode and light emission amount thus set from the camera 1 to the external flash device 3. As a result, the light emission mode and light emission amount are set in the external flash device 3. Therefore, in the following description, the external flash device 3 of the former type is referred to as an external flash device of the self-set type and the external flash device 3 of the latter type is referred to as an external flash device of the camera-set type.

As detailed above, in the camera system of the present embodiment, either an external flash device of the self-set type or an external flash device of the camera-set type may be selected as the external flash device 3 and connected to the camera 1. The external flash device 3 of the self-set type can be set of the light emission mode and light emission amount according to operation inputting to the external flash device by the user. Note that when the external flash device connected to the camera 1 is of the self-set type, the setting of the light emission mode and light emission amount through operation of the operation member 120 is prohibited by the processing of the CPU 101 in the camera 1. On the other hand, when the external flash device connected to the camera 1 is of the camera-set type, the light emission mode and light emission amount of the external flash device are set in the camera 1 in response to the operation by the user of the operation member 120 of the camera 1 while the external flash device is being connected to the camera 1. In this manner, by transmitting information on the light emission mode and light emission amount set by the operation member 120 from the camera 1 to the external flash device, the light emission mode and light emission amount can be set in the external flash device.

Figure 5:
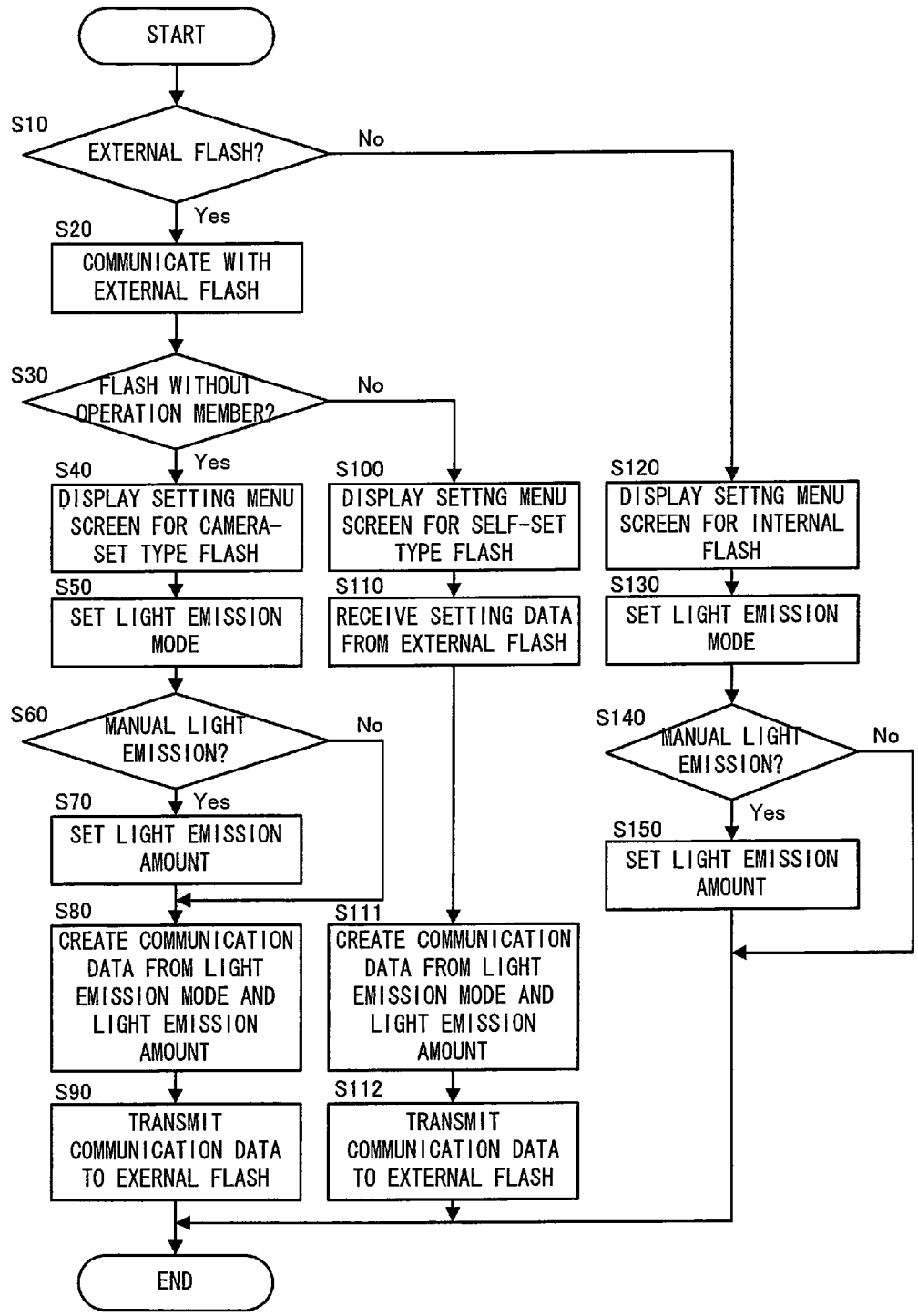
FIG. 5 is a flowchart for illustrating a process performed when the light emission conditions of the external flash device are set.

As detailed above, the setting of the light emission mode and light emission amount of the external flash device 3 connected to the camera 1 can be performed by the different methods depending on the different types of the external flash device 3 connected to the camera 1. A flowchart of the processing executed by the CPU 101 of the camera 1 on this occasion is shown in FIG. 5. The flowchart in FIG. 5 is detailed below.

In a step S10, it has been determined whether or not the external flash device 3 is attached to the camera 1. This determination is made by judging whether or not predetermined data communication is possible between the CPU 101 and the external flash device 3. In concrete terms, a request for transmitting data is issued by the CPU 101 to the external flash device 3. If predetermined data are transmitted from the external flash device 3 to the CPU 101 in response to the request, it is judged that the data communication is possible and it has been determined that the external flash device 3 is attached to the camera 1. In this case, the control flow proceeds to a step S20. On the other hand, if the predetermined data are not transmitted from the external flash device 3 to the CPU 101 even when the request for transmitting data is issued from the CPU 101 to the external flash device 3, it is judged that data communication is impossible and it is not determined that the external flash device 3 has been attached to the camera 1. In this case, the control flow proceeds to a step S120.

Note that the determination in the step S10 may be performed by detecting a power supply monitor signal output from the external flash device 3 to the camera 1. That is, when the power supply of the external flash device 3 is ON, the power supply monitor signal is output from the external flash device 3 to the camera 1. If the power supply monitor signal is detected in the camera 1, it is determined that the external flash device 3 is attached to the camera 1 and the control flow proceeds to the step S20. On the other hand, if the power supply monitor signal is not detected in the camera 1, it is not determined that the external flash device 3 is attached to the camera 1 and the control flow proceeds to the step S120.

In the step S20, communication is performed between the camera 1 and the external flash device 3 attached to the camera 1. On this occasion, a request for transmitting identification data for identifying the type of the external flash device 3 is first made by the CPU 101 to the external flash device 3. The external flash device 3 upon receiving this request transmits identification data corresponding to the type of its own to the CPU 101. For example, in the case of the above-mentioned external flash device of the self-set type, data "1" is transmitted as the identification data. On the contrary, in the case of the external flash device of the camera-set type, data "0" is transmitted as the identification data.

In a step S30, it is determined whether or not the external flash device 3 lacks the above-mentioned operation member for setting light emission conditions based on the content of the identification data transmitted from the external flash device 3 in the step S20. If it has been determined that the external flash device 3 lacks the operation member for setting light emission conditions, that is, if it has been determined that the external flash device 3 is an external flash device of the camera-set type, the control flow proceeds to a step S40. On the other hand, if it has been determined that the external flash device 3 has an operation member for setting light emission conditions, that is, if it has been determined that the external flash device 3 is an external flash device of the self-set type, the control flow proceeds to a step S100.

Note that if the format of the data transmitted from the external flash device 3 is one that is not supported by the camera 1 in the step S20, communication between the camera 1 and the external flash device 3 is impossible, so that information on the set light emission mode and light emission amount can not be transmitted from the camera 1 to the external flash device 3. Accordingly, in this case, it is preferred to determine that the external flash device 3 is an external flash device of the self-set type having an operation member and cause the control flow to proceed to the step S100.

Figure 7A:
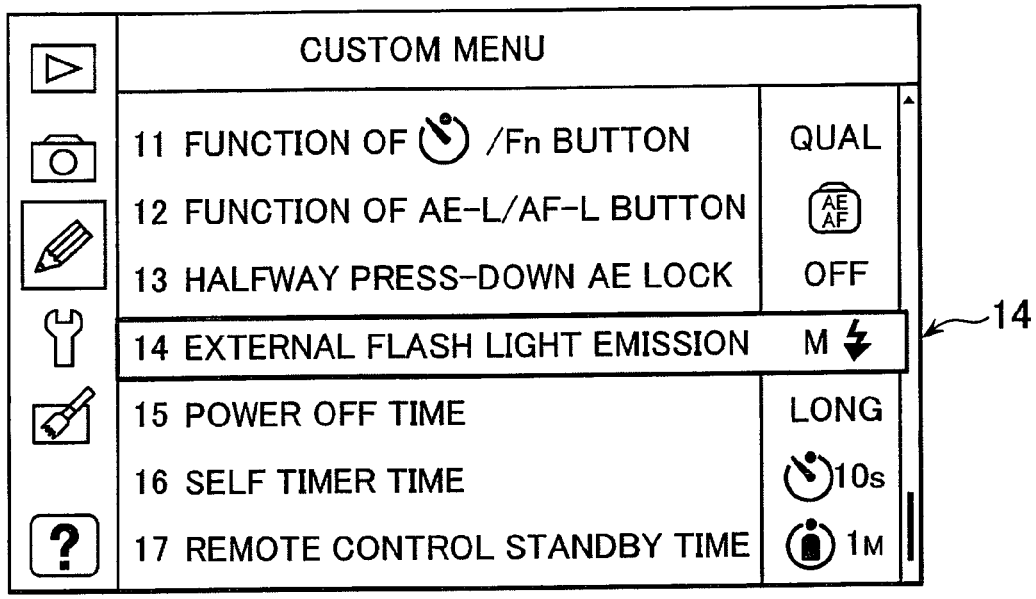
FIG. 7 illustrates an example of a setting menu screen for an external flash device of the type to be set by a camera when the external flash device to be set by a camera is attached to the camera.

If the control flow proceeds from the step S30 to the step S40, then in the step S40, a setting menu screen for setting light emission mode and light emission amount to the external flash device 3 of the camera-set type from the camera 1 (camera-set type flash setting menu screen) is displayed. On this occasion, due to display control from the display device controlling unit 113, a setting menu screen for camera-set type flash as shown in FIG. 7A is displayed on the display device 114.

In a step S50, setting of the light emission mode is performed on the camera-set type flash setting menu screen displayed in the step S40. Here, when the user operates the operation member 120, either one of the automatic light emission mode or manual light emission mode is selected depending on the content of the operation and the selected light emission mode is set. When the light emission mode is set in this manner, the control flow proceeds to a step S60.

Figure 7B:
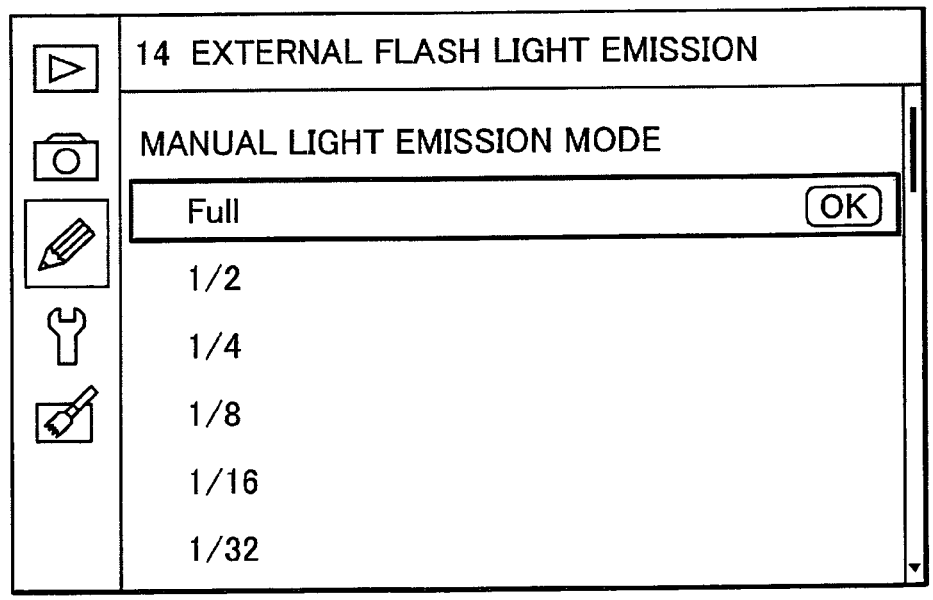

In the step S60, it is determined whether or not the manual light emission mode is set in the step S50. If the manual light emission mode is set, the control flow proceeds to a step S70 and in the step S70, the light emission amount is set. Here, a light emission amount setting screen as shown in FIG. 7B detailed hereinbelow is displayed on the display device 114. When the user operates the operation member 120, either one of the light emission amounts is selected depending on the content of the operation, and the light emission amount is set according to the selected light emission amount. When the light emission amount is set in this manner, the control flow proceeds to a step S80. On the other hand, if it has been determined in the step S60 that the automatic light emission mode instead of the manual light emission mode is set in the step S50, the processing in the step S70 is not executed but the control flow proceeds to the step S80. In this case, the light emission amount is not set since it is unnecessary to do so.

In the step S80, communication data to be transmitted from the camera 1 to the external flash device 3 are created based on the light emission mode set in the step S50 and the light emission amount set in the step S70 when the manual light emission mode is set. The communication data include information on the light emission mode and light emission amount set in the step S50 and the step S70, respectively.

In a step S90, the CPU 101 of the camera 1 transmits the communication data created in the step S80 to the external flash device 3. When the communication data transmitted from the CPU 101 are received by the external flash device 3 in this manner, the external flash device 3 sets its own light emission mode and light emission amount based on the received communication data. Thus, the setting of the light emission conditions of the external flash device 3 is performed. After the processing in the step S90 is executed, the CPU 101 terminates the control flow of the procedure in the flowchart shown in FIG. 5.

As detailed above, when the setting of the light emission conditions is performed in the external flash device 3, the light emission of the external flash device 3 becomes on standby. Then, the light emission of the external flash device 3 is controlled by the CPU 101 according to the set light emission mode and light emission amount.

Figure 8:
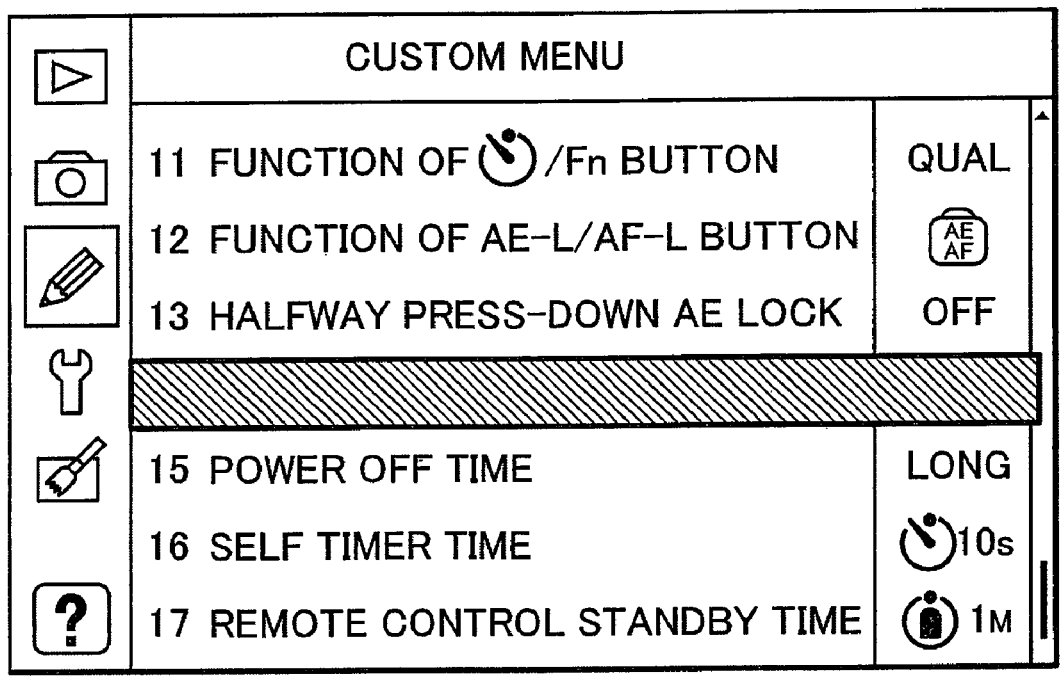
FIG. 8 illustrates an example of a setting menu screen for an external flash device of the type to be set by itself when the external flash device of the self-set type is attached to the camera.

On the other hand, in the event where the control flow proceeds from the step S30 to the step S100, a setting menu screen for informing the user of the fact that the external flash device 3 of the self-set type is connected to the camera 1 (setting menu screen for a self-set type flash) is displayed in the step S100. On this occasion, the setting menu screen for a self-set type flash as shown in FIG. 8 which will be detailed later on is displayed on the display device 114.

In a step S110, the CPU 101 receives the setting data transmitted from the external flash device 3. The received setting data include information on the light emission conditions that are set by the user by operating the operation member of the external flash device 3 in advance and show the set state of the light emission mode and light emission amount of the external flash device 3.

In a step S111, the CPU 101 creates communication data to be transmitted from the camera 1 to the external flash device 3 based on the information on light emission conditions received in the step S110. The created communication data include the information on the light emission mode, the light emission amount, and so on received in the step S110.

In a step S112, the CPU 101 transmits the communication data created in the step S111 to the external flash device 3. When the communication data transmitted by the CPU 101 of the camera 1 are received by the external flash device 3 in this manner, the external flash device 3 finally sets its own light emission mode and light emission amount based on the light emission setting information included in the received communication data. This results in setting the light emission conditions of the external flash device 3. After the processing in the step S112 is executed, the CPU 101 terminates the control flow of the procedure in the flowchart shown in FIG. 5.

When the setting data concerning the light emission conditions of the external flash device 3 are transmitted from the external flash device 3 to the CPU 101 of the camera 1 in the manner detailed above, the CPU 101 recognizes the set states of the light emission mode and light emission amount of the external flash device 3 and light emission of the external flash device 3 becomes on standby. Then, the CPU 101 controls the light emission of the external flash device 3 according to the set light emission mode and light emission amount.

Note that if, in the step S30, it has been determined that the external flash device connected to the camera 1 is of the self-set type and the processing in the steps S100 to S112 has been executed as mentioned above, the setting of the light emission mode and light emission amount by the operation member 120 is prohibited by the processing of the CPU 101 as mentioned above. This prevents the light emission mode and light emission amount of the external flash device from being erroneously set when the user operates the operation member 120 to select the menu.

Figure 6A:
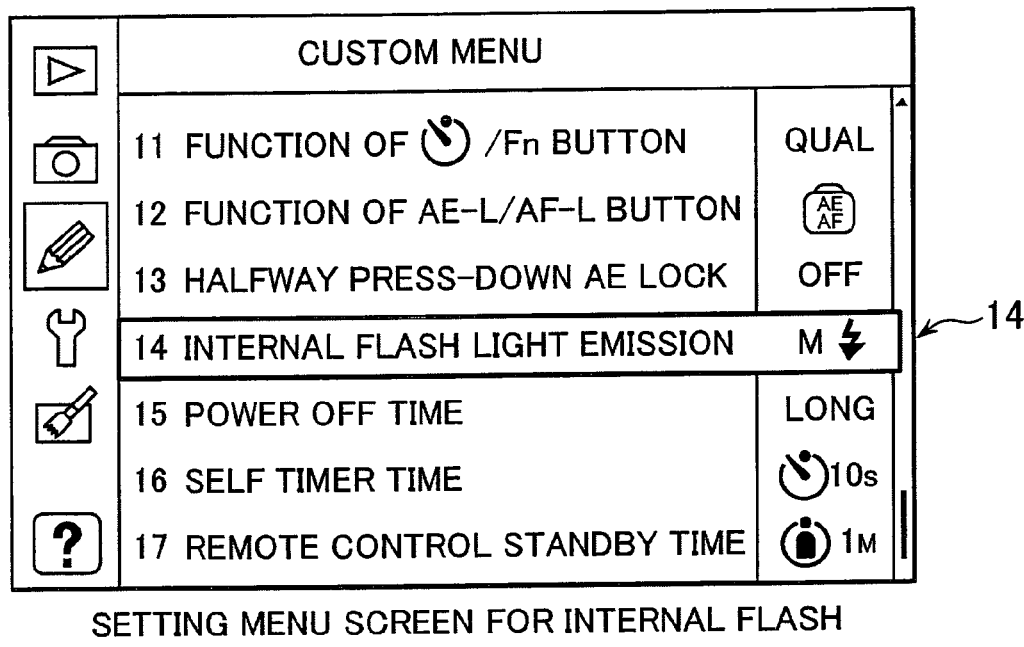
FIG. 6 illustrates an example of a setting menu screen for an internal flash unit to be displayed when no external flash device is attached to the camera.

Further, if it is not determined that the external flash device 3 is attached to the camera 1 and the control flow proceeds from the step S10 to the step S120, then, in the step S120, a setting menu screen for performing setting of light emission conditions to the internal flash device 108 of the camera 1 (setting menu screen for an internal flash) is displayed. On this occasion, a setting menu screen for an internal flash as shown in FIG. 6A detailed later on is displayed on the display device 114 under the display control by the display device controlling unit 113.

After the processing in the step S120 has been executed, processes similar to those in the steps S50 to S70 detailed above are executed in steps S130 to S150, respectively. That is, in the step S130, setting of a light emission mode is performed in the setting menu screen for an internal flash displayed in the step S120. When either one of the automatic light emission mode or manual light emission mode is set by the operation by the user, the control flow proceeds to the step S140.

Figure 6B:
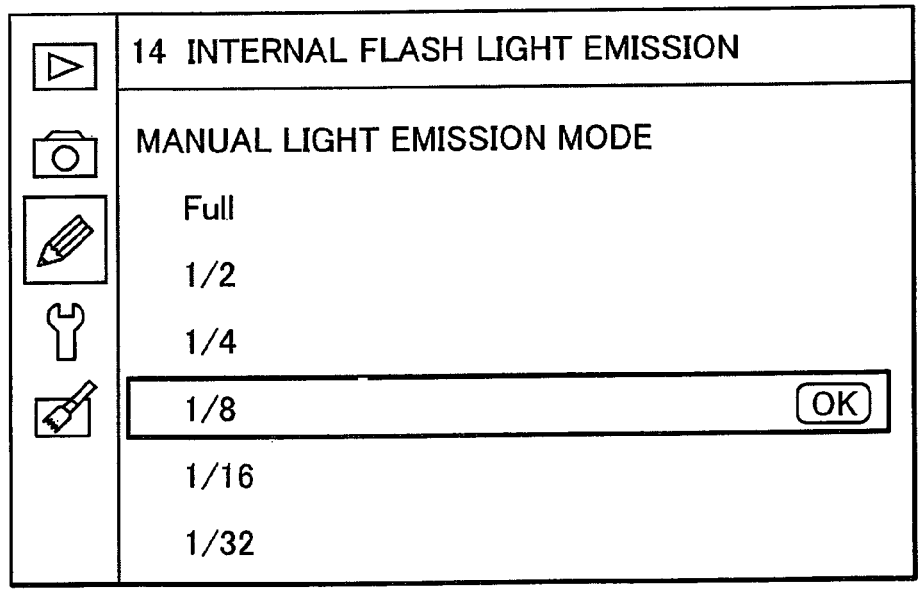

In the step S140, it is determined whether or not the manual light emission mode is set in the step S130. If it has been determined that the manual light emission mode is set, the control flow proceeds to the step S150. In the step S150, setting of light emission amount is performed. Here, a light emission amount setting screen as shown in FIG. 6B detailed later on is displayed on the display device 114. When the light emission amount is set, control flow of the processing in the flowchart shown in FIG. 5 is terminated. On the other hand, if it has been determined in the step S140 that light emission mode is set in the step S130, then the processing in the step S150 is not performed and the control flow terminates the processes in the flowchart.

When the light emission mode and light emission amount are set to the internal flash device 108 in the manner as mentioned above and if the internal flash device 108 is popped up, the light emission thereof is on standby. Then, the CPU 101 controls light emission of the internal flash device 108 according to the set light emission mode and light emission amount. Note that if the internal flash device 108 is not popped up, neither the internal flash device 108 becomes on standby nor is performed light emission control.

Examples of setting menu screen to be displayed on the display device 114 upon executing the procedure in the flowchart shown in FIG. 5 are shown in FIGS. 6A, 6B, 7A, 7B and 8. FIG. 6A shows an example of the setting menu screen for the internal flash device displayed in the step S120 when the external flash device 3 is not attached to the camera 1. In the menu item corresponding to a part surrounded by the frame 14 among the setting menu items included in the setting menu screen, there is displayed an internal flash setting menu with the words "INTERNAL FLASH LIGHT EMISSION". When the user selects the internal flash setting menu, the light emission conditions of the internal flash device 108 is performed.

When the internal flash setting menu surrounded by the frame 14 is selected by the user in the setting menu screen in FIG. 6A and further the manual light emission mode is selected as the light emission mode, then the light emission amount setting screen shown in FIG. 6B is displayed. If the either one of the light emission amounts is selected in response to the operation by the user, the light emission amount of the internal flash device 108 in the manual light emission mode is set.

FIG. 7A shows an example of the setting menu screen for camera-set type flash displayed in the step S40 when the camera-set type external flash device 3 is attached to the camera 1. In the setting menu item corresponding to the part surrounded by the frame 14 among the setting menu items included in the setting menu screen, there is displayed an external flash setting menu with the words "EXTERNAL FLASH LIGHT EMISSION" instead of the internal flash setting menu shown in FIG. 6A. When the user selects the external flash setting menu, setting of the light emission conditions of the external flash device 3 is performed.

When the external flash setting menu surrounded by the frame 14 is selected by the user and the manual light emission mode is set as the light emission mode in the setting menu screen shown in FIG. 7A, the light emission amount setting screen shown in FIG. 7B is displayed. When either one of the light emission amounts is selected in this screen in response to the operation by the user, the light emission amount of the camera-set type external flash device 3 in the manual light emission mode is set.

FIG. 8 shows an example of the setting menu screen for the self-set type flash to be displayed in the step S100 when the self-set type external flash device 3 is attached to the camera 1. In the setting menu item corresponding to the part surrounded by the frame 14 among the setting menu items included in the setting menu screen, there is displayed an internal flash setting menu having a varied display form that differs from the display form shown in FIG. 6A, obtained by blacking out the letters is displayed. This indicates to the user that since the self-set type external flash device 3 is connected to the camera 1, the setting of light emission conditions in the camera 1 is prohibited, so that the light emission mode and light emission amount can not be set.

As detailed above, the setting menu items included in the setting menu screen displayed on the display device 114 are changed depending on the difference in type of the external flash device 3 connected to the camera 1. That is, if the camera-set type external flash device 3 is connected to the camera 1, the setting menu screen as shown in FIG. 7A is displayed. On the contrary, if the self-set type external flash device 3 is connected to the camera 1, the setting menu screen as shown in FIG. 8 is displayed. Further, if the external flash device 3 is not connected to the camera 1, the setting menu screen as shown in FIG. 6A is displayed.

Note that in the above-mentioned explanation, different setting menu screens are displayed depending on the difference in type of the external flash device 3 attached to the camera 1 by changing the setting menu items in the part surrounded by the frame 14 in FIGS. 6A to 8. However, instead of such a method, the different setting menu screen may be displayed by adding new setting menu items or deleting a part of the setting menu items.

For example, if the external flash device 3 is not connected to the camera 1, an internal flash setting menu with the words "INTERNAL FLASH LIGHT EMISSION" is displayed in the part surrounded by the frame 14 in FIG. 6A in the same manner as mentioned above. On the other hand, if the camera-set type external flash device 3 is connected to the camera 1, an external flash setting menu with the words "EXTERNAL FLASH LIGHT EMISSION" is additionally displayed below the internal flash setting menu. On this occasion, the internal flash setting menu may be displayed as it is to enable setting of the light emission conditions of the internal flash device 108 or the internal flash setting menu may be blacked out so as not to enable setting of the light emission conditions of the internal flash device 108. Further, if the self-set type external flash device 3 is connected to the camera 1, the internal flash setting menu may be deleted or black-out displayed. Alternatively, the internal flash setting menu may be displayed as it is to enable setting of the light emission conditions of the internal flash device 108.

Next, a warning display indicated when the external flash device 3 attached to the camera 1 is not set to face in the direction of the front of the camera 1 is explained. The external flash device 3 has a structure adapted to be changed of the direction of light emission by the user into any desired direction, for example, in a direction other than the direction of the front of the camera 1. However, if the user performs photographing without knowing that the direction of light emission of the external flash device 3 is turned to a direction other than the direction of the front of the camera 1, there is the possibility that a subject could be photographed in inappropriate light emission conditions not contemplated by the user. Accordingly, if the external flash device 3 is directed in a direction other than the direction of the front of the camera 1, a warning display is performed so that the user can known it even when he or she is just in a state of holding the camera 1.

The above-mentioned warning display is performed by different methods depending on the type of the external flash device 3. In the case of the self-set type external flash device 3, the operation member for setting light emission conditions as mentioned above is provided to the external flash device 3. The operation member usually includes a display member such as a liquid crystal display. Therefore, the warning display may be performed using the display member. On the contrary, in the case of the camera-set type external flash device 3, no operation member for setting light emission conditions is provided to the external flash device 3. Therefore, the warning display must be performed using the display device 114 of the camera 1.

Figure 9:
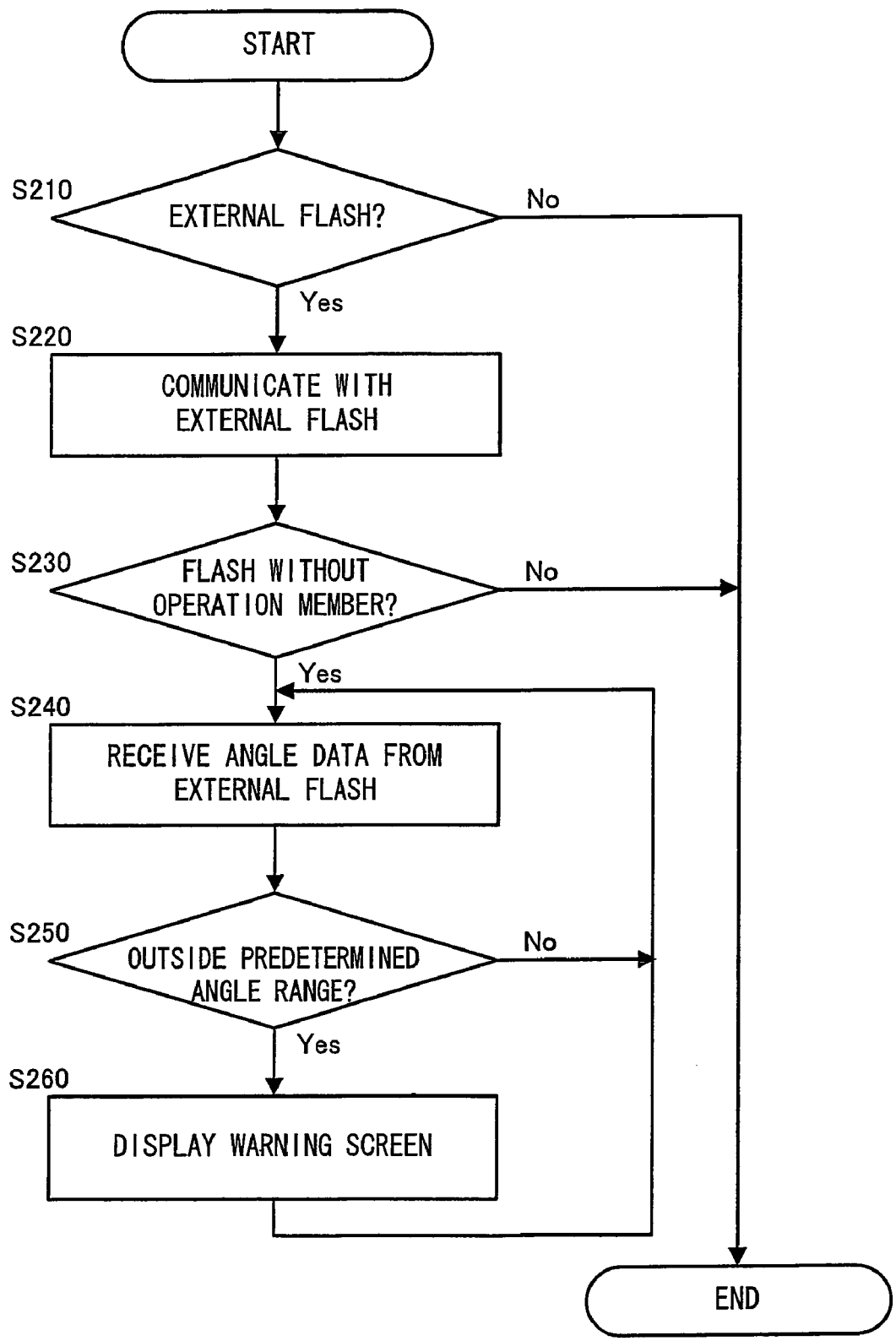
FIG. 9 is a flowchart illustrating a process to be performed when a warning display is presented using the display unit of the camera.

The flowchart shown in FIG. 9 illustrates the flow of processing to be executed by the CPU 101 of the camera 1 when a warning display is performed using the display device 114 of the camera 1. This flowchart is detailed below.

In steps S210 to S230, each processing similar to that in each of the steps S10 to S30 shown in FIG. 5 is executed respectively. That is, in the step S210, it has been determined whether or not the external flash device 3 is attached to the camera 1. If it has been determined that the flash device 3 is attached to the camera 1, then the control flow proceeds to the subsequent step S220. On the other hand, if it has not been determined that the external flash device 3 is attached to the camera 1, the control flow terminates the procedure in the flowchart shown in FIG. 9. In this case, no warning display is performed. In the subsequent step S220, communication is performed between the camera 1 and the external flash device 3 attached thereto. This enables transmission of identification data from the external flash device 3 to the CPU 101 corresponding to the type of the external flash device 3.

In the step S230, it is determined whether or not an operation member is present in the external flash device 3 based on the content of the identification data transmitted from the external flash device 3 in the step S220. If it has been determined that no operation member is present, that is, if it has been determined that the external flash device 3 is the camera-set type external flash device, then the control flow proceeds to a step S240. On the other hand, if it has been determined that there is an operation member, that is, the external flash device 3 is the self-set type external flash device, the procedure of the flowchart shown in FIG. 9 terminates. In this case, no warning display is performed in the camera 1 but a warning display is performed by a display device included in the operation member provided in the external flash device 3.

In the step S240, the CPU 101 receives angle data transmitted from the camera-set type external flash device 3 to the camera 1. The angle data represent the direction of light emission in the external flash device 3 and are output by the external flash device 3 at predetermined timing.

Figure 10:
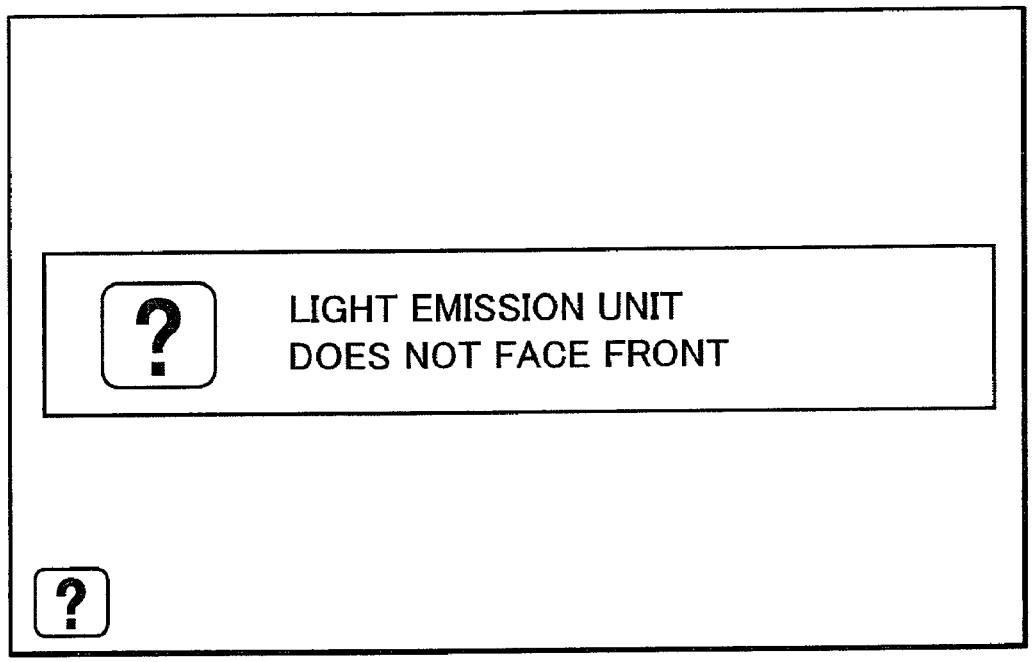
FIG. 10 illustrates an example of a warning screen to be displayed in the event where the external flash device faces in a direction other than a direction toward the front of the camera.

In a step S250, it is determined whether or not the direction of the external flash device 3 is outside a predetermined angle range centered on an angle that corresponds to the angle of the direction of the front of the camera 1 based on the angle data received in the step S240. If it has been determined that the direction of the external flash device 3 is outside the predetermined angle range, the control flow proceeds to a step S260 and a warning screen for informing the user to this effect is displayed on the display device 114. An example of the warning screen displayed on this occasion is shown in FIG. 10. Displaying such a warning screen on the display device 114 enables the user to know that the external flash device 3 does not face in the direction of the front of the camera 1 even when he or she is in as state of holding the camera 1.

After the processing in the step S260 is executed to display a warning screen, the control flow returns to the step S240 and the above-mentioned procedure is repeated. This allows the warning screen to continue to be displayed if the external flash device 3 is not directed toward the front of the camera 1. On the other hand, if it has not been determined in the step S250 that the direction of the external flash device 3 is outside the predetermined angle range, the processing in the step S260 is not executed and the control flow returns to the step S240. In this case, the warning screen as shown in FIG. 10 is not displayed.

According to the above-mentioned embodiment, the following advantageous effects can be obtained.

(1) Either one of a self-set type external flash device provided with an operation member for setting light emission conditions whose light emission amount is settable according to an operation input to the external flash device 3 by a user or a camera-set type external flash device provided with no operation member for setting light emission conditions whose light emission amount is settable based on information on a light emission amount transmitted from the camera 1 is connectable to the camera 1 as the external flash device 3. The camera 1 displays an image having a different content on the image display unit 114 between when the self-set type external flash device is connected thereto and when the camera-set type external flash device is connected thereto. With this configuration, the camera can be operated appropriately taking into consideration a difference in the light emission setting method in the external flash device attached to the camera.

(2) The camera 1 causes a setting menu item included in the self-set type flash setting menu screen displayed on the image display unit 114 in the step S100 when the self-set type external flash device is connected to the camera 1 and a setting menu item included in the camera-set type flash setting menu screen displayed on the image display unit 114 in the step S40 when the camera-set type external flash device is connected to the camera 1 to vary from each other to thereby cause the content of the image displayed on the image display unit 114 to differ. With this configuration, appropriate setting menu screen can be displayed in each case depending on a difference in light emission setting method in the external flash device attached to the camera.

(3) The camera 1 displays on the display unit 114 a setting menu screen for an internal flash as shown in FIG. 6A including an internal flash setting menu (step S120) when the external flash device 3 is not connected to the camera. On the other hand, when the self-set type external flash device 3 is connected to the camera, the camera 1 displays on the display unit 114 a setting menu screen as shown in FIG. 8 with a varied display form of the internal flash setting menu (step S100). Further, when the camera-set type external flash device 3 is connected to the camera 1, the camera 1 displays on the image display device 114 a camera-set type flash setting menu screen as shown in FIG. 7A including an external flash setting menu (step S40). With this configuration, optimal setting menu screen can be displayed in each case so that the user can operate without fail.

(4) When the camera-set type external flash device 3 is connected to the camera 1, the camera 1 displays on the display device 114 a warning screen as shown in FIG. 10 (step S260), while when the self-set type external flash device 3 is connected to the camera 1, the camera 1 displays no warning screen on the image display unit. With this configuration, if the external flash device does not face in a predetermined direction, the user can be informed to this effect even when the external flash device connected to the camera includes no display member.

(5) When a camera-set type external flash device is connected to the camera 1, the camera 1 sets a light emission amount of the external flash device through the operation member 120 (step S70). Information on the light emission amount thus set is transmitted to the external flash device under control by the CPU 101 (step S90). With this configuration, the user can set any desired light emission amount even when the external flash device without the operation member for setting light emission conditions is connected to the camera 1.

(6) The camera 1 determines whether or not the external flash device 3 connected to the camera is a self-set type external flash device (step S30). As a result, if it has been determined that the external flash device is a self-set type external flash device, the camera 1 through control by the CPU 101 prohibits setting of the light emission amount of the external flash device through the operation member 120. With this configuration, erroneous setting of the light emission amount that would otherwise occur when the user operates the operation member 120 can be prevented.

Note that while explanation has been made on the camera system of the digital type that photographs a subject and records data of the image taken, the present invention is also applicable to a camera of the film type that records a photographed image of a subject on a film.

Further, in the above-mentioned embodiment, an example in which the type of the external flash device 3 connected to the camera 1 is either one of a self-set type external flash device or a camera-set type external flash device has been explained. However, the present invention is also applicable to the case in which the external flash device 3 having a form other than those described above is attached to the camera 1. For example, when the external flash device 3 that can not set light emission mode and light emission amount is connected to the camera 1, it can be handled in the same manner as the case in which a self-set type external flash device is connected to the camera 1. Also, when the external flash device 3 having both the features of the self-set type and the camera-set type is connected to the camera 1, it is preferably handled in the same manner as the case in which the camera-set type external flash device is connected to the camera 1. In this case, when the setting of light emission conditions is performed in either one of the methods, the content of the setting of light emission conditions performed previously is overwritten.

The above-mentioned embodiment and various variations are exemplary and the present invention should not be construed as being limited thereto unless the features of the present invention are damaged.

What is claimed is:

1. A camera system comprising a camera having an image displaying unit that displays various images and an external flash device that is connected to the camera when in use, wherein:

either one of a first external flash device whose light emission amount is settable according to an operation input to the first external flash device by a user or a second external flash device whose light emission amount is settable based on information on a light emission amount transmitted from the camera is connectable to the camera as the external flash device; and the camera displays an image having a different content on the image display unit between when the first external flash device is connected thereto and when the second external flash device is connected thereto, wherein:

the camera displays a setting menu screen including various setting menu items for performing various types of setting on the image display unit; and the camera causes a setting menu item included in the setting menu screen displayed on the image display unit when the first external flash device is connected to the camera and a setting menu item included in the setting menu screen displayed on the image display unit when the second external flash device is connected to the camera to vary one from another to thereby cause the content of the image displayed on the image display unit to differ;

when the external flash device is not connected to the camera, the camera displays on the image display unit a setting menu screen including an internal flash setting menu which is a setting menu item for performing setting of a light emission amount of the internal flash device incorporated in the camera;

when the first external flash device is connected to the camera, the camera displays on the image display unit a setting menu screen with a varied display form of the internal flash setting menu; or when the second external flash device is connected to the camera, the camera displays on the image display device a setting menu screen including an external flash setting menu which is a setting menu item for performing setting of a light emission amount of the external flash device instead of the internal flash setting menu.

2. A camera system comprising a camera having an image displaying unit that displays various images and an external flash device that is connected to the camera when in use, wherein:

either one of a first external flash device whose light emission amount is settable according to an operation input to the first external flash device by a user or a second external flash device whose light emission amount is settable based on information on a light emission amount transmitted from the camera is connectable to the camera as the external flash device; and the camera displays an image having a different content on the image display unit between when the first external flash device is connected thereto and when the second external flash device is connected thereto, wherein:

when the second external flash device is connected to the camera and if a direction of the second external flash device is not a predetermined direction, the camera displays on the image display device a warning screen for informing a user to this effect; or when the first external flash device is connected to the camera, the camera does not display the warning screen on the image display unit.

3. A camera adapted to be connected with an external flash device, comprising:

an operation member that sets a light emission amount of the external flash device when the external flash device is connected to the camera;

a light emission amount setting unit that transmits information on the light emission amount set by the operation member to the external flash device;

a determination unit that determines whether or not the external flash device connected to the camera is a self-set type external flash device whose light emission amount is settable in response to an operation input by a user into the external flash device; and a controlling unit that prohibits setting of the light emission amount through the operation member when it is determined by the determination unit that the external flash device is the self-set type external flash device.

4. A camera comprising an image displaying unit that displays various images, the camera being connectable to an external flash when the camera is in use, wherein:

either one of a first external flash device whose light emission amount is settable according to an operation input to the first external flash device by a user or a second external flash device whose light emission amount is settable based on information on a light emission amount transmitted from the camera is connectable to the camera as the external flash device;

the camera displays an image having a different content on the image display unit between when the first external flash device is connected thereto and when the second external flash device is connected thereto; and when the second external flash device is connected to the camera and if a direction of the second external flash device is not a predetermined direction, the camera displays on the image display device a warning screen for informing a user to this effect, or when the first external flash device is connected to the camera, the camera does not display the warning screen on the image display unit.

5. A camera comprising an image displaying unit that displays various images, the camera being connectable to an external flash device when the camera is in use, wherein:

either one of a first external flash device whose light emission amount is settable according to an operation input to the first external flash device by a user or a second external flash device whose light emission amount is settable based on information on a light emission amount transmitted from the camera is connectable to the camera as the external flash device;

the camera displays an image having a different content on the image display unit between when the first external flash device is connected thereto and when the second external flash device is connected thereto;

the camera displays a setting menu screen including various setting menu items for performing various types of setting on the image display unit;

the camera causes a setting menu item included in the setting menu screen displayed on the image display unit when the first external flash device is connected to the camera and a setting menu item included in the setting menu screen displayed on the image display unit when the second external flash device is connected to the camera to vary one from another to thereby cause the content of the image displayed on the image display unit to differ;

when the external flash device is not connected to the camera, the camera displays on the image display unit a setting menu screen including an internal flash setting menu which is a setting menu item for performing setting of a light emission amount of the internal flash device incorporated in the camera; and when the first external flash device is connected to the camera, the camera displays on the image display unit a setting menu screen with a varied display form of the internal flash setting menu, or when the second external flash device is connected to the camera, the camera displays on the image display device a setting menu screen including an external flash setting menu which is a setting menu item for performing setting of a light emission amount of the external flash device instead of the internal flash setting menu.

* * * * *